(12) United States Patent
van der Meulen et al.

(10) Patent No.: US 10,360,716 B1
(45) Date of Patent: Jul. 23, 2019

(54) ENHANCED AVATAR ANIMATION

(71) Applicant: Amazon Technologies, Inc., Seattle, WA (US)

(72) Inventors: Pieter Sierd van der Meulen, Los Altos, CA (US); Aditi Chandrashekhar Dixit, San Jose, CA (US); Sanjoy Ghosh, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 461 days.

(21) Appl. No.: 14/858,451

(22) Filed: Sep. 18, 2015

(51) Int. Cl.
  *G06T 13/80* (2011.01)
  *G10L 13/00* (2006.01)

(52) U.S. Cl.
  CPC ............. *G06T 13/80* (2013.01); *G10L 13/00* (2013.01); *G06T 2213/12* (2013.01)

(58) Field of Classification Search
  None
  See application file for complete search history.

(56) References Cited

U.S. PATENT DOCUMENTS

| | | | | |
|---|---|---|---|---|
| 6,539,354 B1* | 3/2003 | Sutton | ............... | G10L 21/06 345/423 |
| 2004/0024822 A1* | 2/2004 | Werndorfer | ........... | G06F 3/0481 709/206 |
| 2004/0215460 A1* | 10/2004 | Cosatto | ............... | G06F 16/9577 704/260 |
| 2007/0055527 A1* | 3/2007 | Jeong | ................... | G10L 13/033 704/260 |
| 2008/0163074 A1* | 7/2008 | Tu | ........................... | G10L 13/08 715/758 |
| 2010/0141662 A1* | 6/2010 | Storey | .................... | G06T 13/40 345/473 |
| 2013/0038601 A1 | 2/2013 | Han et al. | | |
| 2014/0122081 A1* | 5/2014 | Kaszczuk | .............. | G10L 13/08 704/260 |
| 2015/0287403 A1 | 10/2015 | Holzer Zaslansky et al. | | |
| 2018/0063325 A1 | 3/2018 | Wilcox et al. | | |

OTHER PUBLICATIONS

Non Final Office Action dated Mar. 15, 2019 for U.S. Appl. No. 15/820,062 "Processing Speech to Drive Animations on Avatars" Roche, 41 pages.

* cited by examiner

*Primary Examiner* — Ke Xiao
*Assistant Examiner* — Jed-Justin Imperial
(74) *Attorney, Agent, or Firm* — Lee & Hayes, P.C.

(57) ABSTRACT

Avatar animation may be enhanced to reflect emotion and other human traits when animated to read messages received from other users or other messages. A message may be analyzed to determine visual features associated with data in the message. The visual features may be depicted graphically by the avatar to create enhanced avatar animation. A text-based message may include indicators, such as punctuation, font, words, graphics, and/or other information, which may be extracted to create the visual features. This information may be used to select visual features as special animation, which may be implemented in animation of the avatar. Examples of visual features include animations of laughter, smiling, clapping, whistling, and/or other animations.

20 Claims, 9 Drawing Sheets

ENHANCED AVATAR ANIMATION

BACKGROUND

Avatars or other graphical characters may be animated to appear to speak words and/or take other actions. For example, an avatar may be animated to have its mouth move to mimic speaking words or making other vocal sounds. This animation may be synchronized with audio to create an appearance that the avatar is actually speaking the words when the animation is played back by an output device such as a television.

In conventional animation, an actor may speak words or create other sounds for a character, which may be recorded and stored as audio. Next, an animator may create an avatar that mimics the spoken words such that the movements of a mouth of the avatar, when sequenced together, make the avatar appear to speak the words or otherwise make the sounds. However, the process may also work in reverse, where the animation is generated first and then the audio is created based on the animation. Regardless, of the order, the audio is synchronized with the animation to create a predetermined scene, such as a scene in an animated video or a scene in a video game. The animation is often customized for the scene, which is a time consuming process that is not scalable.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
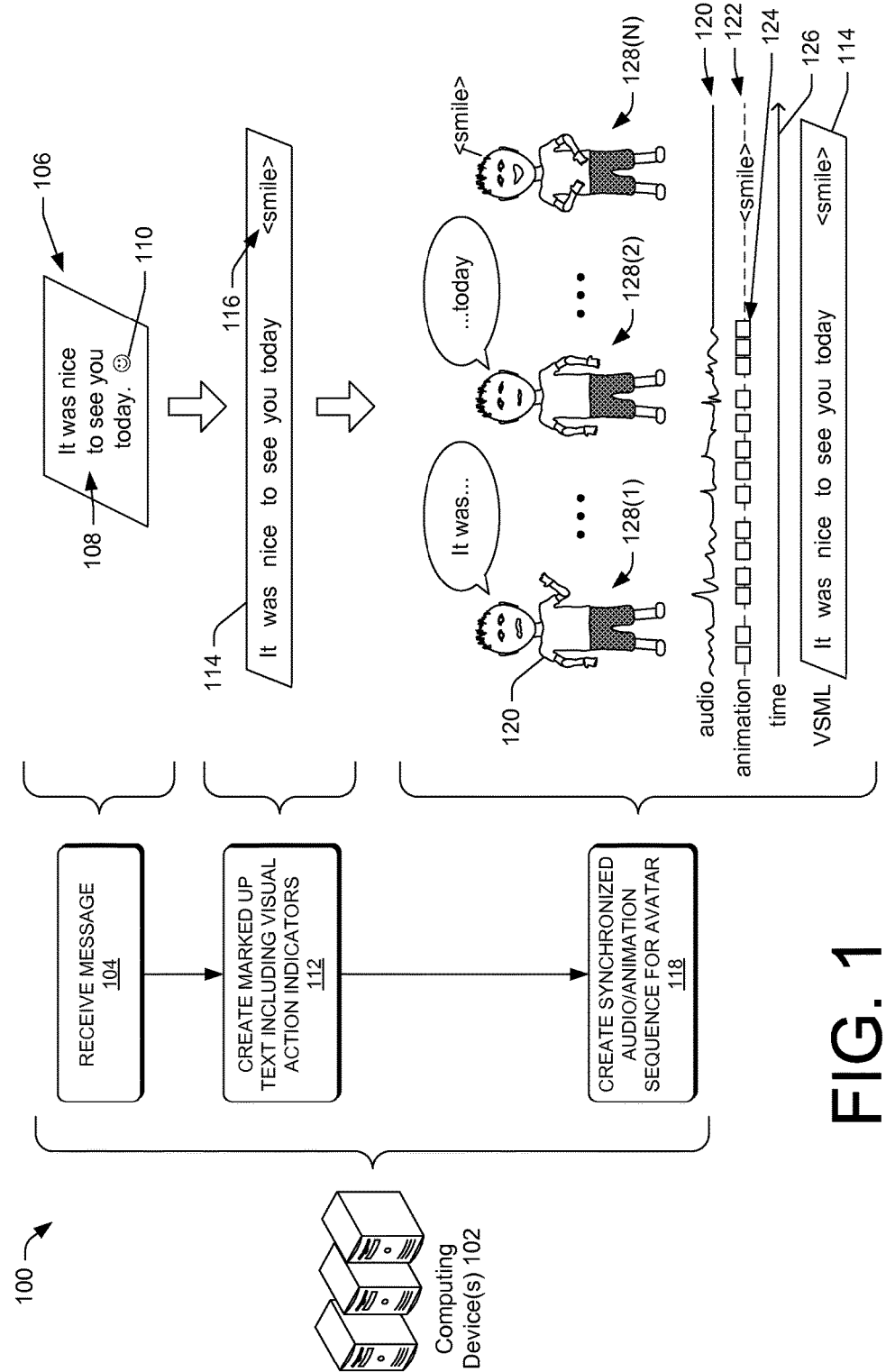
FIG. 1 is a pictorial flow diagram of an illustrative process of enhancing avatar animation based on visual actions determined from analysis of a message.

This disclosure is directed to enhancements of avatar animation, which may include determining and implementing visual features that are extracted from information contained in a message or other data source. The visual features may be depicted graphically by the avatar to create enhanced avatar animation. For instance, an avatar may be generated to visually output (e.g., visually read) a text-based message received by a device. The text-based message may include indicators, such as punctuation, font, words, icons, and/or other information, which may be extracted to create the visual features. An example text-based message may include graphics or icons (e.g., emoticons such as a smiling face, etc.), common abbreviations (e.g., LOL for "laugh out loud", etc.), and/or other emotional indicators. When animation is automatically generated for a message, this information is often ignored or otherwise not reflected in the animation for the avatar. As disclosed herein, this information is extracted and used to select visual features as special animation, which may be implemented in animation of the avatar. For example, the avatar may be animated to appear to laugh during or after speaking a text-based message that includes "LOL" as part of the message. Corresponding audio may be synchronized with the visual features. In the example, above, a sound of laughter may be included with speech data or before/after the speech data.

In some embodiments, a message or other data to be visually depicted by an avatar is analyzed to determine special audio and/or visual features. These special features may be used to enhance audio and/or video output during animation of the avatar. In some embodiments, the message may comprise simple text that is converted to special text that represents the special audio/visuals. As discussed herein, audio synthesis markup language (ASML) may be used to associate special audio with the message, which may include speech as well as non-speech sounds (e.g. laughing, coughing, whistling, booing, etc.). Visual synthesis markup language (VSML) may be used to associate special visual animations with the message, such as animations to depict a state of excitement, laughter, sadness, concern, and/or any other state-of-mind associated with the message. The special text may be generated by analysis of the content of the message, use of emphasis (e.g., bold text, italics, etc.), use of graphics/icons, a context of message, use of punctuation, and/or other indicators in the message.

In some embodiments, visemes, which are basic visual depictions of speech sound, may be generated for each phoneme. The visemes may be selected for a given message and used to generate animation for an avatar to make the avatar appear to speak words included in the message. As disclosed herein, various visemes may be created to depict various emotions for each phoneme. For example, a first viseme may be created for a non-emotional visual depiction of a spoken phoneme, a second viseme may be created for an excited visual depiction of the spoken phoneme, and so forth. The visemes may be selected and sequenced to make an avatar convey a visual feature (e.g. excitement, sadness, enthusiasm, laughter, frustration, anger, etc.) when reading or otherwise speaking words or making sounds.

The techniques and systems described herein may be implemented in a number of ways. Example implementations are provided below with reference to the following figures.

FIG. 1 is a pictorial flow diagram of an illustrative process 100 of enhancing avatar animation based on a visual synthesis created from analysis of a message. The process 100 may be executed by one or more computing device 102.

At 104, the computing device(s) 102 may receive a message 106 or other data from another computing device. For example, the message 106 may be a text-based message received from a mobile telephone. The message 106 may be a result of a search, such as an internet search or database search triggered in response to a question from a user. Regardless of the origin of the message 106, the message may include content, indicia, graphics (e.g., emoticons, etc.), special or unusual text formatting (e.g., emphasis, etc.), punctuation, and/or other marks or features that may be associated with a visual action used to create or select animation of an avatar or other graphics. For example, the visual action may be specific facial movements (e.g., smile, wink, etc.), movements of laughter, body movements, eye movements, mouth movements, and/or other types of animated movements used to convey the visual action. As shown in FIG. 1, the message 106 includes text 108 of "It was nice to see you today" and a graphic 110 depicting a smiling face.

At 112, the computing device(s) 102 may create visual synthesis markup language (VSML) text 114 that includes at least one visual action indicator 116. VSML may be analogous to speech synthesis markup language (SSML), but may be used to indicate visual actions rather than, or in addition to, speech variations. Visual action indicators may be created or selected based on an analysis of content of the message 106. For example, the graphic 110 of the smiling face may be associated with a visual action of smiling, and may be used to create the visual action indicator 116, such as marked up text of "<smile>", which may be inserted into text or instructions that are further processed to determine animation of an avatar or other graphics. For example, the visual action indicators may be created for input in an Extensible Markup Language (XML) document or other similar document.

The text 108 may also be analyzed and used to create visual action indicators. For example, when the text 108 indicates an emotional state of a person (e.g., happy, sad, frustrated, annoyed, etc.), an action (e.g., laugh, smile, jump, etc.), or other content that can be translated into a visual action, then the computing device(s) 102 may create additional visual actions based on the text 108. The text 108 may include other indicators, such as punctuation, text format (e.g., bold type, italics, all capital letters, etc.), which may also be used to create visual actions, such as a visual action of shouting, excitement, and so forth.

At 118, the computing device(s) may create a synchronized audio/animation sequence for an avatar 120 based at least in part on the VSML text 114. For example, the computing device(s) 102 may use an audio processor to perform text-to-speech to create an audio track 120 representative of the message 106. The audio track 120 may be formed from phonemes associated with words in the text 108. The computing device(s) 102 may create an animation sequence 122 that is based in part on visemes 124 of the speech from the audio track 116. The visemes may be based on the phonemes in the audio track 120. The animation sequence 122 may also include visual actions based on the visual action indicator 116. Although the animation sequence 118 shows the visual action indicator 116 as separate from the visemes 124 (e.g., smile after reading the text), the visual action indicator 116 may be overlaid with the visemes 124, such as to create an appearance of the avatar 120 smiling while speaking the text.

As shown in FIG. 1, the audio track 116 is represented with respect to a timeline 126, along with the animation sequence 122. An abbreviated illustrative animation sequence 128(1)-(N) shows the avatar 120 speaking and acting out visual indicators included in the VSML text 114. The animation sequence 128(N) shows part of a smile action representing the visual action indicator 116.

Although the concepts discussed herein are described in the context of animation of an avatar, the techniques and systems may be used to create virtually any visual action, animation, or other representation of virtually any graphical object. The visual actions are not limited to speech movements, but may also include body movements, such as jumping, clapping hands, and/or other movements of appendages, limbs, bodies, or body parts. Further, the techniques and systems may be used to create the VSML text 114 without human input. Thus, a message or other textual data may be analyzed and used to create VSML, which may then be used to create visual outputs.

In some embodiments, the avatar 120 may be used to assist a user of a computing device. The avatar 120 may be animated to appear to read or act out messages for the user. Besides just mimicking actions of speaking, the avatar may be animated, through use of the visual action indicators and VSML, to provide additional visual movements based on the content of a message, and thus appear more life-like and interesting. Thus, the avatar 120 may be animated to show excitement, sadness, frustration, and/or other types of emotions, perform other types of actions (e.g., clap, jump, etc.), and so forth. The animation may be generated by piecing together animation sequences, such that the animation may be generated without prerecording an entire animation sequence for a message. In some embodiments, the animation for a message may be assembled "on the fly" such that it is created from animation building blocks that include visemes, animation snippets (short animation sequences for a particular action or emotion), and/or other short animations that can be combined with other animations to create a longer animation sequence. As discussed herein, visemes are referred to as mouth movements that can be associated with phonemes.

Figure 2:
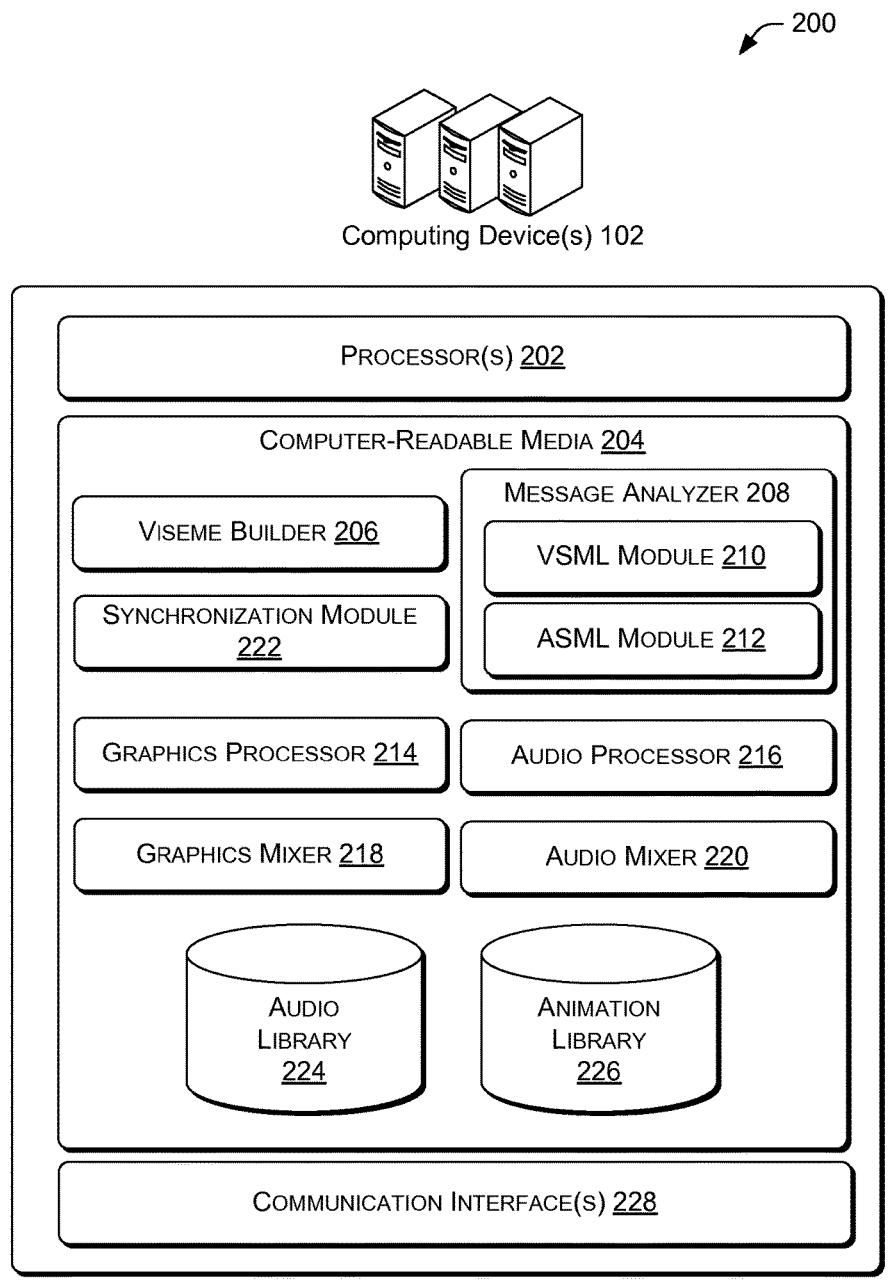
FIG. 2 is a block diagram of illustrative computing architecture configured to enhance avatar animation.

FIG. 2 is a block diagram of illustrative computing architecture 200 configured to enhance avatar animation. The computing architecture may be implemented in part or in whole in the computing device(s) 102. The computing architecture 200 may be implemented in a distributed computing environment (e.g., cloud computing services, etc.) or a non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the computing device(s) 102.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be by an Internet download.

In some embodiments, the computer-readable media 204 may store a viseme builder 206, a message analyzer 208, a VSML module 210, an ASML module 212, a graphics processor 214, an audio processor 216, a graphics mixer 218, an audio mixer 220, and a synchronization module 222, which are described in turn. The computer-readable media 204 may store an audio library 224 and/or an animation library. However, the audio library 224 and/or the animation library 226 may be stored remotely, possibly by another service or host, and made accessible to the computing device(s) 102. The computing architecture 200 may include communication interfaces 228 to enable communication with other computing devices, such as end user devices, intermediate devices, and so forth. For example, the communication interfaces 228 may include wireless and/or wired network communication devices. The components may be stored together or in a distributed arrangement.

The viseme builder 206 may create or assist in creating, associating, or otherwise generating visemes that are associated with phonemes of spoken words. As discussed further with reference to FIG. 6, multiple versions of a viseme may be created to reflect other visual actions, such as speaking while laughing or speaking while smiling (among many other possibilities). In various embodiments, a viseme may be created by an animator. In some embodiments, a viseme may be created by modifying an existing viseme. The visemes may be associated with phonemes such that a first viseme is associated with a first phoneme. However, visemes typically do not have a one-to-one relationship with phonemes, thus a same viseme may be associated with multiple different phonemes (or vice versa). Once created and associated with one or more phoneme, the visemes may be stored in the animation library 226. The visemes may be used as building blocks to create animations, as discussed further below. The animation library 226 may include other animations such as animation snippets (short animations) for actions such as laughing, jumping, clapping, etc. Similarly, audio may be stored in the audio library 224, which may include phonemes, sample sounds (e.g., an earcon, etc.), and other sounds.

The message analyzer 208 may receive messages or other text and/or data and determine characteristics, through analysis, which may be used to enhance animation of an avatar that speaks the text. The message analyzer 208 may also determine characteristics that enhance audio or speech of the user. For example, the message analyzer 208 may identify at least one of a graphic (e.g., an emoticon, etc.), special or unusual text formatting (e.g., emphasis, all capital letters, etc.), punctuation, and so forth. The message analyzer may perform the analysis using predetermined rules, a lookup table, and/or other techniques to identify text/graphics commonly associated with visual actions. The message analyzer 208 may also analyze a context and words of a message to determine characteristics, such as by identifying words, abbreviations (e.g., LOL, CUL8R, etc.), which may be associated with special sounds and/or visual actions (e.g., laughing, waving goodbye, etc.). The message analyzer 20 may include the VSML module 210 and the ASML module 212.

The VSML module 210 may create visual markups in VSML text or a VSML document that includes visual action indicators associated with visual characteristics identified by the message analyzer 108. For example, the message analyzer 108 may identify an emoticon representing a smiling face. The VSML module 210 may then create a visual action indicator associated with smiling for placement in VSML text. Many other examples are provided below, such as examples provided below with reference to FIG. 5.

Similarly, the ASML module 212 may create audio markups in ASML text or an ASML document that includes audio indicators associated with audio characteristics identified by the message analyzer 108. For example, the message analyzer 108 may identify text of "LOL" in a message, which is commonly used as an abbreviation of "laugh out loud". The ASML module 210 may then create an audio indicator associated with a laughing sound for placement in ASML text. Many other examples are provided below, such as with reference to FIG. 5. ASML may be similar to SSML, but may also include audio other than speech, such as sounds of laughing, clapping hands, whistling, and so forth. In some embodiments the VSML module and ASML module may be combined into a single module that creates a single output SML text/document including both audio and animation markups.

The graphics processor 214 may process results of the VSML module 210 to create an animation sequence associated with time. For example, the graphics processor 214 may select visemes and/or animation snippets or other animations from the animation library based on the content of the VSML text/document.

The audio processor 216 may process results of the ASML module 212 to create an audio/speech sequence associated with time. For example, the audio processor 216 may select phonemes and/or sample sounds or other sounds from the audio library 224 based on the content of the ASML text/document. In some embodiments, the audio processor 216 may be implemented by one or more text-to-speech (TTS) algorithms.

The graphics mixer 218 may mix the animation generated and/or selected by the graphics processor 214. For example the graphics mixer 218 may modify timing, smooth transitions, and/or otherwise modify the animation to create animation that is synchronized with audio from the audio mixer 220. The graphics mixer 218 may receive input from the synchronization module 222 to synchronize the animation with the audio.

The audio mixer 220 may mix the audio generated and/or selected by the audio processor 216. For example the audio mixer 220 may modify timing, smooth transitions, and/or otherwise modify the audio to create audio/speech that is synchronized with animation from the animation mixer 218. The audio mixer 220 may receive input from the synchronization module 222 to synchronize the audio with the animation.

The synchronization module 222 may provide inputs to the graphics mixer 218 and/or the audio mixer 220 to enable synchronization of the audio and animation. The synchronization module 222 may use an iterative process to create the synchronization.

Figure 3:
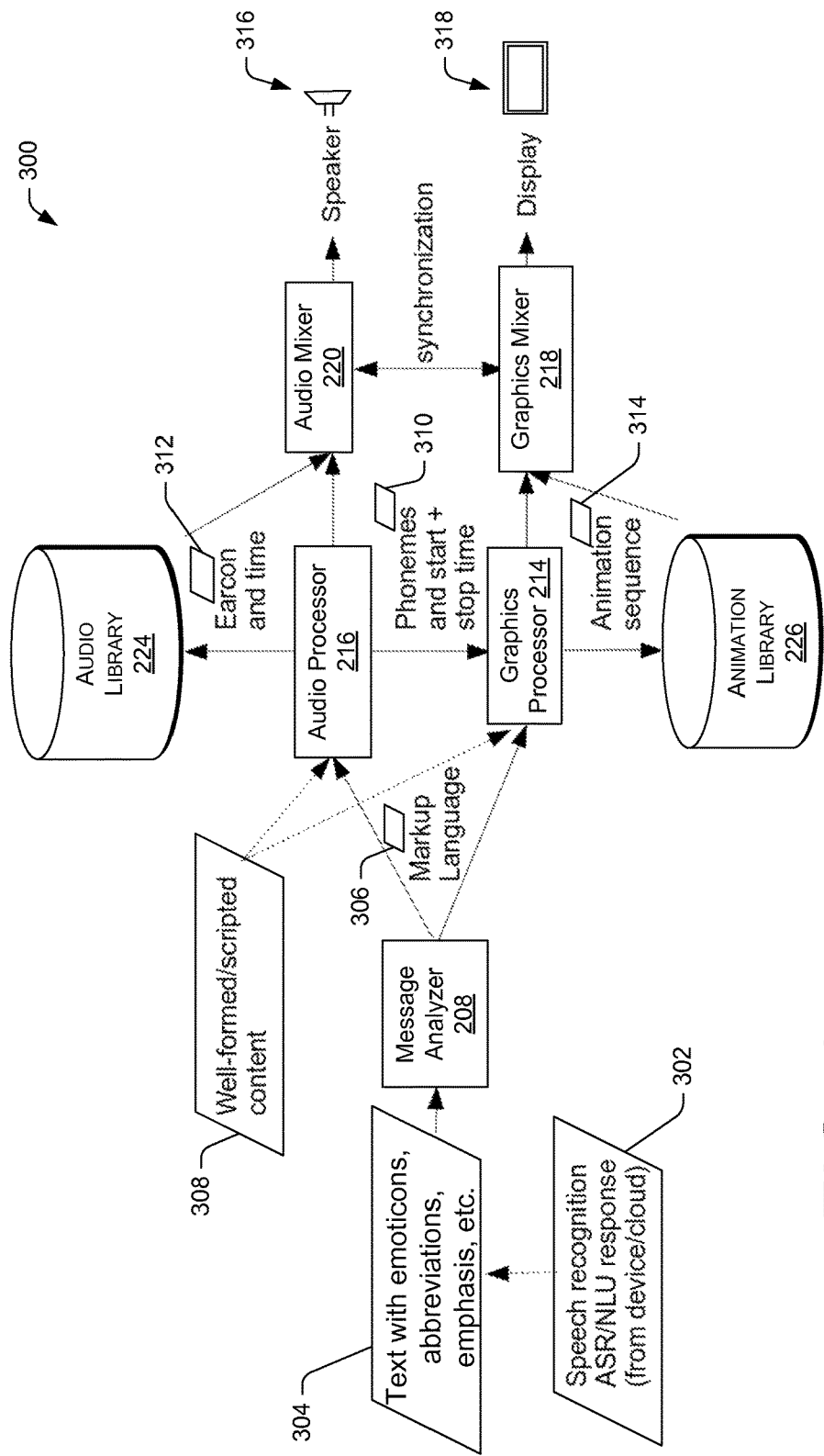
FIG. 3 is a block diagram showing processing of data by illustrative components shown in FIG. 2.

FIG. 3 is a block diagram showing an illustrative workflow 300 of processing of data by illustrative components shown in FIG. 2. The illustrative workflow shows example interaction and data with respect to the components described above.

Data 302 may be generated in response to audio received by a microphone. For example, a user may speak a command, which may be received and processed by a device using automated speech recognition (ASR) and possibly using natural language understanding (NLU) algorithm(s). This information may result in receipt of a message 304, which may include text with emoticons, abbreviations, special font, and/or other characteristics which may be used to modify speech and/or animation representing the content of the message 304.

The message analyzer 208 may analyze the message 304, possibly using the VSML module 210 and/or the ASML module 212 to create visual action indicators and/or audio indicators in marked up language data (markup data) 306. In some embodiments, previously marked up data 308 may be used to supplement the markup data 306 or possibly used to create the markup data 306. For example, the previously marked up data 308 may include SSML, which may include speech markups, but not visual action markups or other audio (non-speech sounds) markups. The markup data 306 may be inputted to the graphics processor 214 and/or the audio processor 216.

The audio processor 216 may generate phonemes data 310 that includes phonemes including start and stop times based on the text in the message 306 and information in the markup data 306. The phonemes data 310 may be sent to the graphics processor 214 to assist in selecting visemes and creating timing for the visemes and/or other animations. The audio processor 216 may send the phonemes data 310 to the audio mixer 220 for further processing. In addition, the audio processor 216 may determine other audio data 312 to be included based on the markup data 306, which may include earcons or other sounds that may not be speech. The audio process may obtain these sounds from the audio library 224, which may then be processed by the audio mixer with the phonemes.

Meanwhile, the graphics processor 214 may create animation data 314, such as by selecting visemes corresponding to the phonemes and/or based on the markup data 306. For example, the graphics processor 214 may determine that the markup data 306 includes a visual action indicator for laughter for association with some words (e.g., <laugh> that's funny</laugh>). The visemes selected for "that's funny" may include a laughing animation. Additional, non-speech animations may be selected by the graphics processor 214 as part of the animation data 314, possibly from the animation library 226. The animation data 314 may be transmitted to the graphics mixer 218 for further processing.

As discussed above, the audio mixer 220, the graphics mixer 218, and the synchronization module 222 may operate cooperatively to create synchronized audio/animation for output to one or more speaker 316 and/or display 318. In some embodiments, the mixers and/or synchronization may utilize human input in decision making processes to modify outputs. However, the mixers and/or synchronization may be performed automatically by inspecting the sequences of audio/animation, and modifying the sequences based on predetermined rules and algorithms that create smooth transitions between sounds and/or animation, such as by applying fading techniques.

Additional variations of the workflow 300 are discussed below in illustrative processes that describe various flow diagrams.

FIGS. 4 and 7-9 show illustrative processes illustrated as a collection of blocks in a logical flow graph, which represent a sequence of operations that can be implemented in hardware, software, or a combination thereof In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
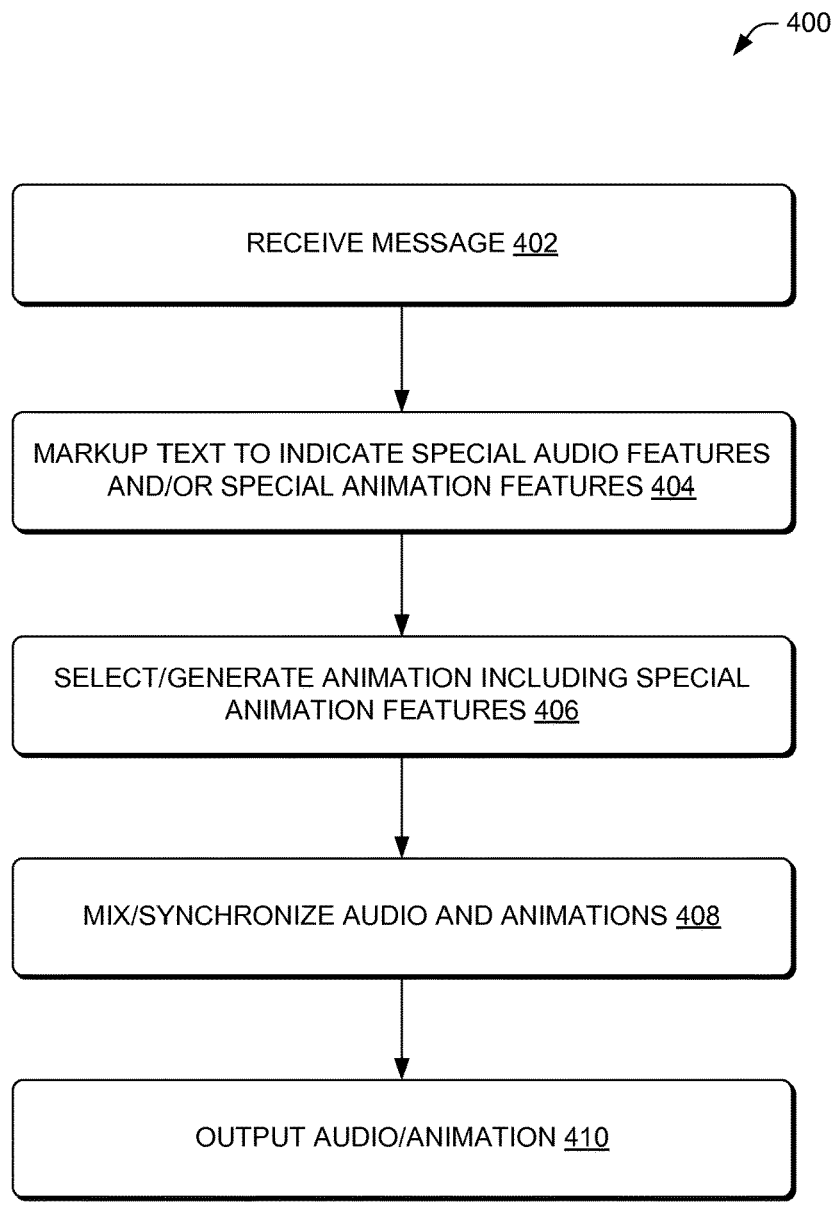
FIG. 4 is a flow diagram of an illustrative process of marking up text to indicate special audio features and/or special animation features used to enhance avatar animation.

FIG. 4 is a flow diagram of an illustrative process 400 of marking up text to indicate special audio features and/or special animation features used to enhance avatar animation. The process 400 is described with reference to at least the computing architecture 200 described above.

At 402, the message analyzer 208 may receive a message or other data to be output to a user device via an animated avatar used to speak, via animation, at least some words. The message may include simple text, special text, including graphics such as emoticons, and/or marked up text, such as SSML text. In some instances, the message may be a response to a user's request, such as a response to a request to perform a command. The message may be virtually any type of text-based message, such as an electronic mail (email), a text message, a short message service (SMS) message, a multimedia message service (MMS) message, an instant message, and/or other types of messages. In some instances, the message may be in audio format. For example, the message may be an audio track, which may be converted to text by speech-to-text algorithms for analysis and processing purposes as described below.

At 404, the message analyzer 208 may markup text to indicate special audio features and/or special visual features. The message analyzer 208 may identify information in the text and/or metadata, as well as a context of the message. The message analyzer 208 may identify specific words that map to special audio features and/or special visual features, such as the words "laugh" and "whistle". Some words may map to visual features, but not audio features, such as "smile." Other aspects of the message, such as special or unusual text formatting (e.g., emphasis, all capital letters, etc.), punctuation, spacing, and/or other aspects may also be identified and associated with audio and/or visual features to be implemented by the avatar. The message analyzer 208 may create an ASML and/or a VSML text/document (or a combined text/doc) to transmit this data to the graphics processor 214 and/or the audio processor 216. In some embodiments, the message analyzer 208 may determine a speed, a pitch, a volume, and/or other attributes of speech, which may be included in the audio features and/or visual features.

At 406, the graphics processor 214 may generate and/or select animation including special animation based on the output from the message analyzer 208. For example, the graphics processor 214 may receive phonemes for speech generated by a text-to-speech processor (e.g., the audio processor 216), and then select visemes corresponding to the phonemes and also corresponding to visual action indicators in the VSML text, such as indicators of "smile", "frustration", "excitement," and so forth. Thus, the animation may be compiled in a sequence that conveys the visual action (e.g., state of mind, emotion, etc.).

At 408, the graphics mixer 218 may mix/synchronize the animation with audio, such as the speech output by a text-to-speech algorithm. The mixing may include smoothing transitions between the visemes and/or other animations, among other possible edits or processes to create a continuous and presentable animation. The synchronization may synchronize the audio and animation using the synchronization module 222 discussed above.

At 410, the resulting animation and audio may be output, by way of an avatar that speaks text in the message 402. The avatar may be a personal assistant that is animated to appear to read communications such as emails and text messages, responds to user commands, and/or performs other services for a user or in response to user requests. The avatar may be output by a mobile telephone, a tablet computer, a television, a set top box, and/or any other electronic device with outputs devices of a speaker and/or display screen or projector.

Figure 5:
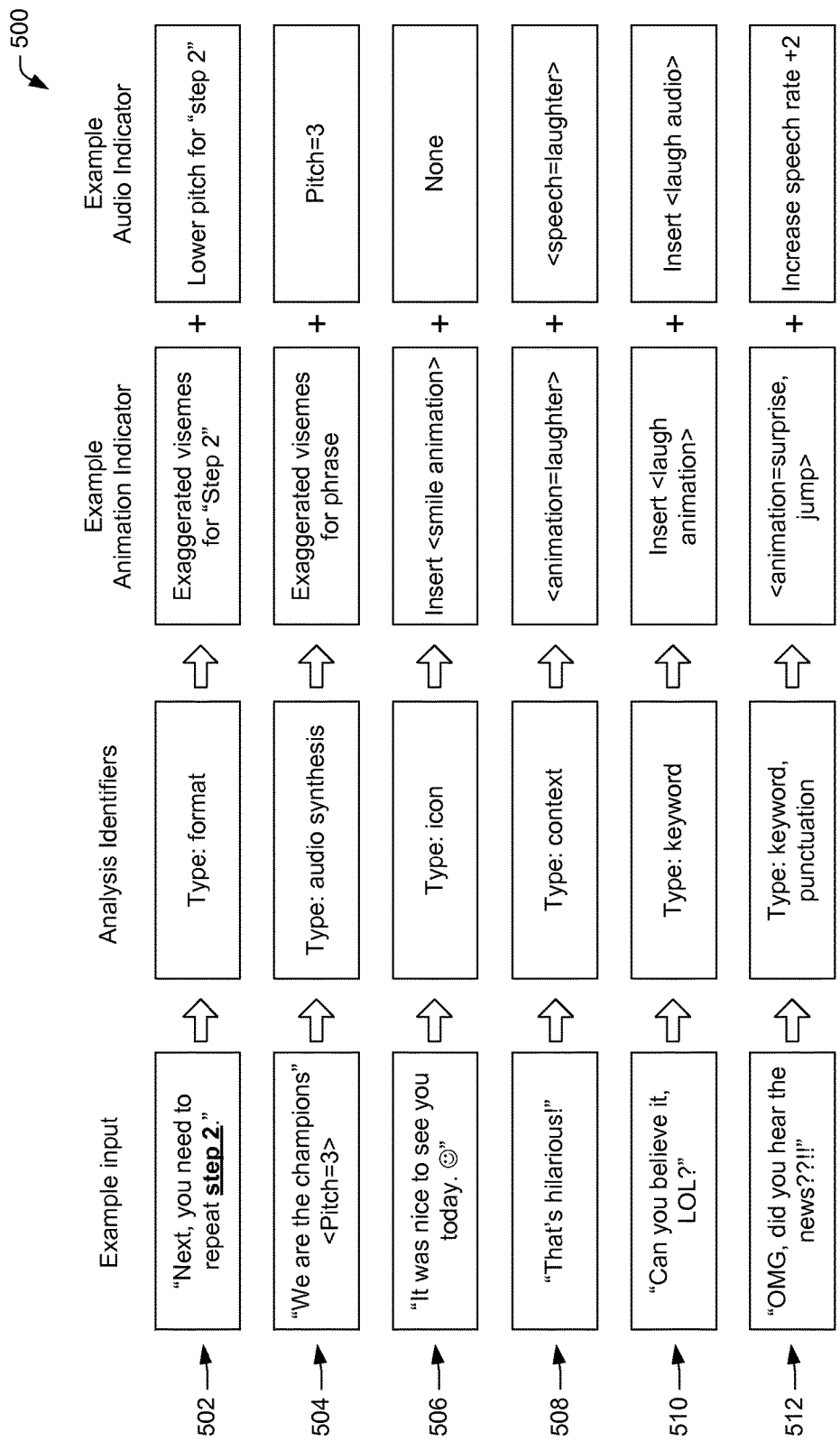
FIG. 5 is a schematic diagram of illustrative indicators generated from illustrative messages.

FIG. 5 is a schematic diagram of illustrative indicators 500 generated from illustrative messages. The indicators may be generated by the operation 404 described with reference to the process 400. The follow examples are not exhaustive, but a sample of some processing of messages to form VSML and ASML text/documents used by the graphics processor and/or audio processor.

In a first example 502, a message may include text "Next, you will need to repeat<bold> step 2</bold>" (possibly with other font indicators). The message analyzer 208 may determine the occurrence of a font "bold." The VSML module 210 may create a visual action indicator of <exaggerated visemes for "step 2">, which may be inserted into an output directed to the graphics processor 214. The ASML module 212 may create an audio indicator of <lower pitch for "step 2">, which may be inserted into an output directed to the audio processor 216.

In a second example 504, a message may include SSML text "<pitch=3>we are the champions". The message analyzer 208 may determine the occurrence of an SSML marker <pitch=3>. The VSML module 210 may create a visual action indicator of <exaggerated visemes >we are the champions</exaggerated visemes>, which may be inserted into an output directed to the graphics processor 214. The ASML module 212 may implement the SSML as the ASML.

In a third example 506, a message may include text "it was nice to see you today :-)" (possibly with a graphic or emoticon). The message analyzer 208 may determine the occurrence of a graphic." The VSML module 210 may create a visual action indicator of <smile>, which may be inserted into an output directed to the graphics processor 214 as a single event or for implementation with speaking of text. The ASML module 212 may not create any audio indicator in this example.

In a fourth example 508, a message may include text "that's hilarious!". The message analyzer 208 may determine the occurrence of the word "hilarious" and punctuation of "!". The VSML module 210 may create a visual action indicator of "</laugh visual>that's hilarious</laugh visual>", which may be inserted into an output directed to the graphics processor 214. The ASML module 212 may create an audio indicator of "</laugh audio>that's hilarious</laugh audio>", which may be inserted into an output directed to the audio processor 216.

In a fifth example 510, a message may include text "Can you believe it LOL?". The message analyzer 208 may determine the occurrence of the term LOL, which commonly is used to mean "laugh out loud." The VSML module 210 may create a visual action indicator of "can you believe it <laugh animation>", which may be inserted into an output directed to the graphics processor 214. The ASML module 212 may create an audio indicator of "can you believe it <laugh audio>", which may be inserted into an output directed to the audio processor 216.

In a sixth example 512, a message may include text "OMG, did you hear the news??!!". The message analyzer 208 may determine the occurrence of a term "OMG" which commonly is used to mean "Oh my God", as well as unusual punctuation "??!!" The VSML module 210 may create a visual action indicator of <surprise>did you hear the news<jump></surprise>, which may be inserted into an output directed to the graphics processor 214. As shown in this example a markup indicator may overlap with another markup indicator to show two or more visual actions at once (e.g., smile+jump, etc.). The ASML module 212 may create an audio indicator of "<speech rate +2>did you hear the news", which may be inserted into an output directed to the audio processor 216.

Figure 6:
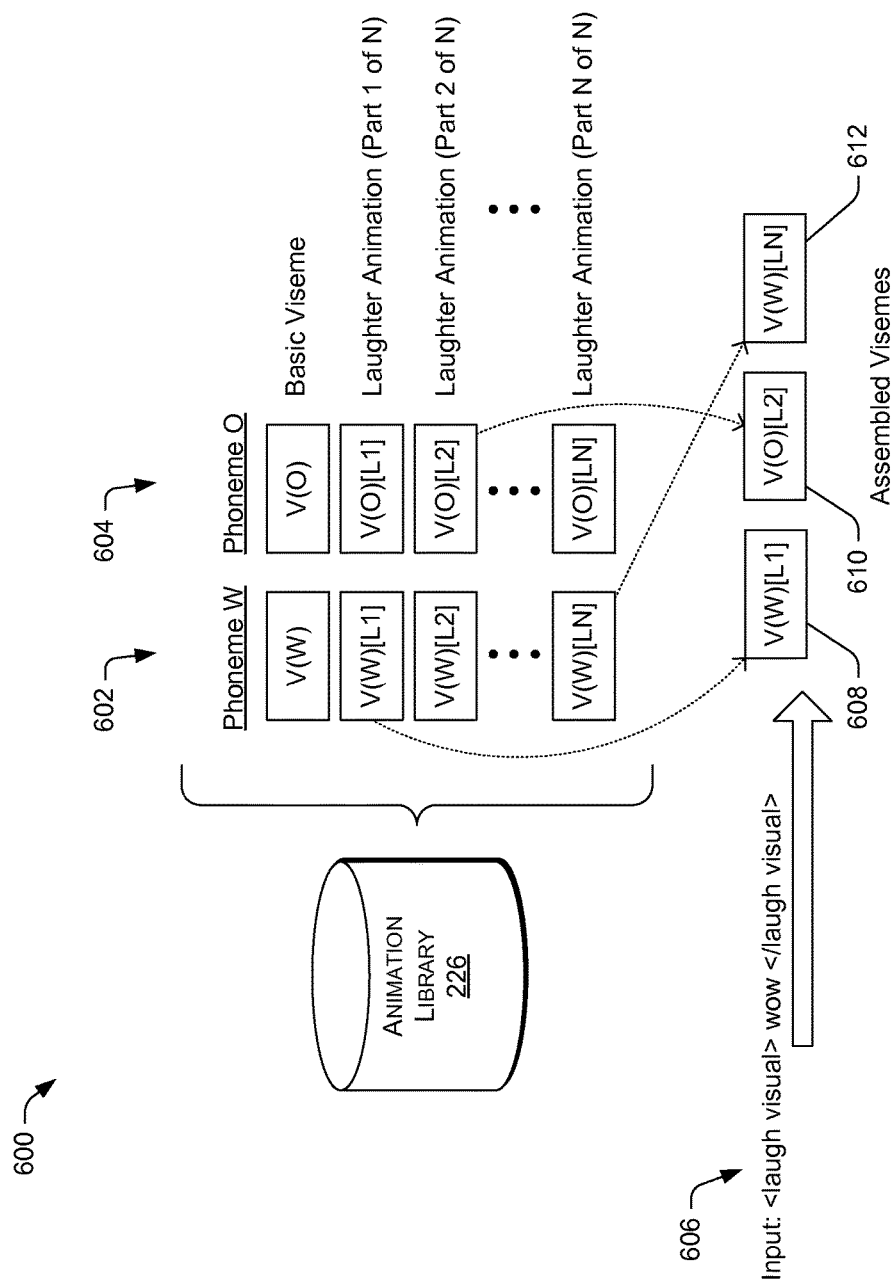
FIG. 6 is a schematic diagram of creating illustrative speech animation by selection of visemes.

FIG. 6 is a schematic diagram of creating illustrative speech animation 600 by selection of visemes. The creation may be performed by the graphics processor 214 using visemes created using the visemes builder 206.

In the illustrative example, a number of visemes 602 are generated for a phoneme associated with a sound of "O" 602 and a phoneme associated with a sound of "W" 604 (of course, phonemes may also be created). For example, the sound of "O" may include a basic viseme of a basic sound (without additional enhancements like excitement, laughter, etc.). Additional visemes may be created to show animations of laughter and/or other types of animations (e.g., excitement, sadness, etc.). In some embodiments, multiple visemes may be created for an enhanced sound to enable creation of an animated sequence. For example, when laughing and talking, there may be multiple possible movements of laughter associated with each viseme. These may be selected and stitched or sequenced together to create a smooth animation of laughter and of the words spoken. As shown here, a VSML text 606 may include the following example text with visual indicators: "<laugh visual>wow</laugh visual>".

The graphics processor 214 may select visemes V(W)[L1] 608, V(O)[L2] 610, and V(W)[LN] 612 to create an animation sequence for this word spoken while laughing. The animation may be created to start and end at a point where a consecutive string of the selected visemes (e.g., L1, L2 LN) result in a smooth and continuous animation. As shown in FIG. 6, the number of visemes (1)-(N) indicates a number of sequenced movements for an action, such as laughter, which may require multiple frames of animation to create an action that represents laughter, for example.

Figure 7:
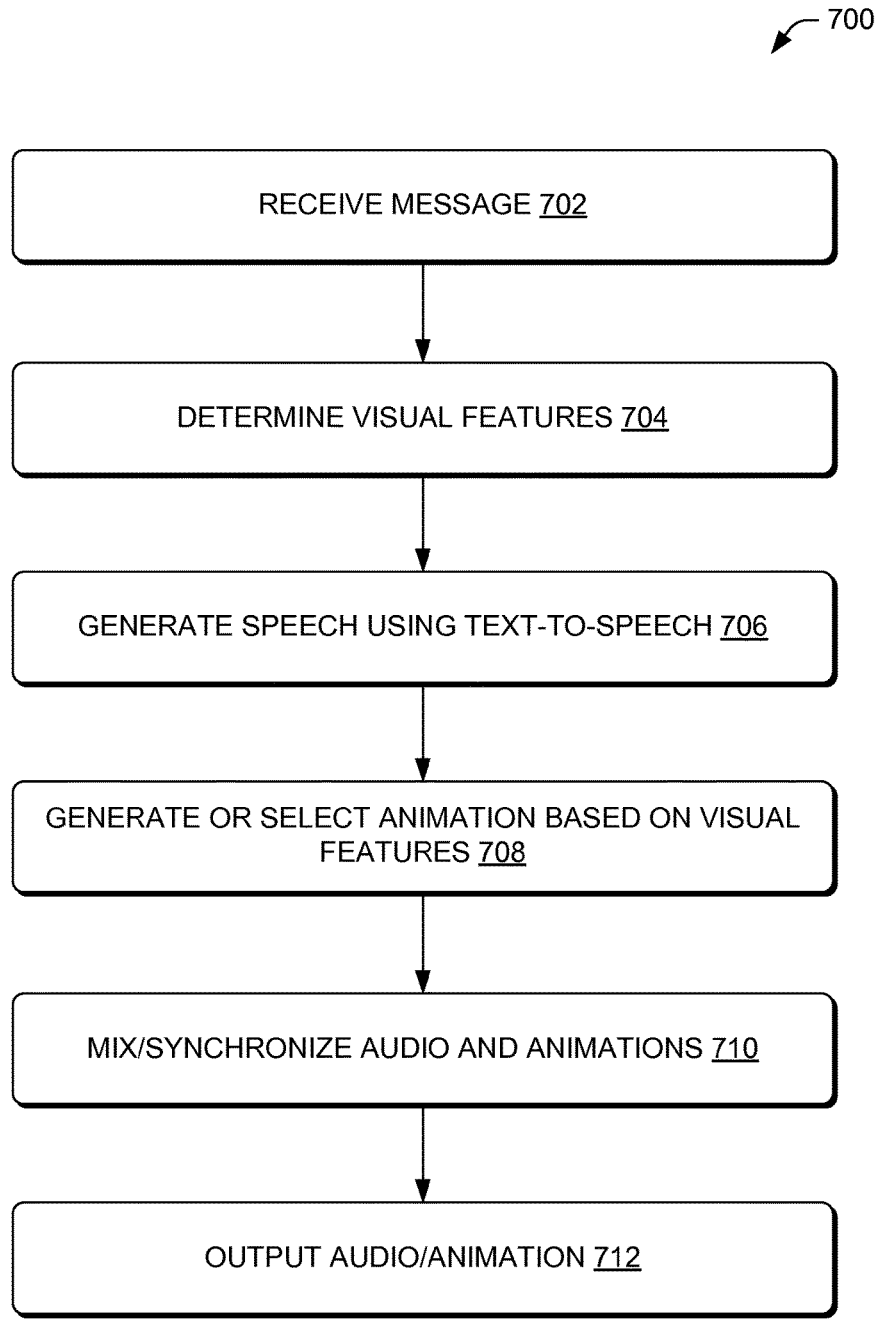
FIG. 7 is a flow diagram of an illustrative process of determining visual features to enhance avatar animation where the visual features are selected independent from audio features.

FIG. 7 is a flow diagram of an illustrative process 700 of determining visual features to enhance avatar animation where the visual features are independent from audio features. The process 700 is described with reference to at least the computing architecture 200 described above.

At 702, the message analyzer 208 may receive a message or other data to be output to a user via an avatar using at least some speech. The message may include simple text, special text, including graphics such as emoticons, and/or marked up text, such as SSML text. In some instances, the message may be a response to a user's request, such as a response to a request to perform a command.

At 704, the message analyzer 208 may determine visual features from analysis of the message or text received at the operation 702. For example, the message analyzer 208 may inspect SSML text to determine speech indicators, which may be transformed into visual indicators for creation of VSML text. Visual features may also be created using the techniques described above and shown by example in FIG. 6. For example, information that indicates an emotion or state of mind of an originator of the message may be identified from text, punctuation, formatting, emoticons, word choice, and/or other information in the message or about the message (e.g., metadata, SSML markups, etc.).

At 706, the audio processor 216 may generate speech using text-to-speech (TTS). The speech may or may not include special audio features/indicators as discussed above. For example, the speech may be basic speech created using a standard set of standard phonemes that are combined to create the basic speech. Basic speech, as used herein, is speech without a discernable emotional or excitement state, and thus ordinary conversation speech.

At 708, the graphics processor 214 may create or select animation based on the visual features identified at the operation 704. For example, when the visual feature is laughter resulting from detection of a term "LOL", "hilarious", or a laughing emoticon, then the selected animation sequence may include a sequence that cause an avatar to appear to laugh. This may be added into an animation sequence at any point before, during, or after the avatar is animated to appear to speak the words generated by the TTS algorithm from the operation 706.

At 710, the graphics mixer 218 may mix and/or synchronize the speech and animations to align the avatar's animated movements with sounds from the speech. The speech may be delayed (e.g., include a pause), to allow for insertion of an animation, such as a laughing or smiling animation.

At 712, the audio and animation may be sent to a user device and/or output by speakers and/or a display or projector.

Figure 8:
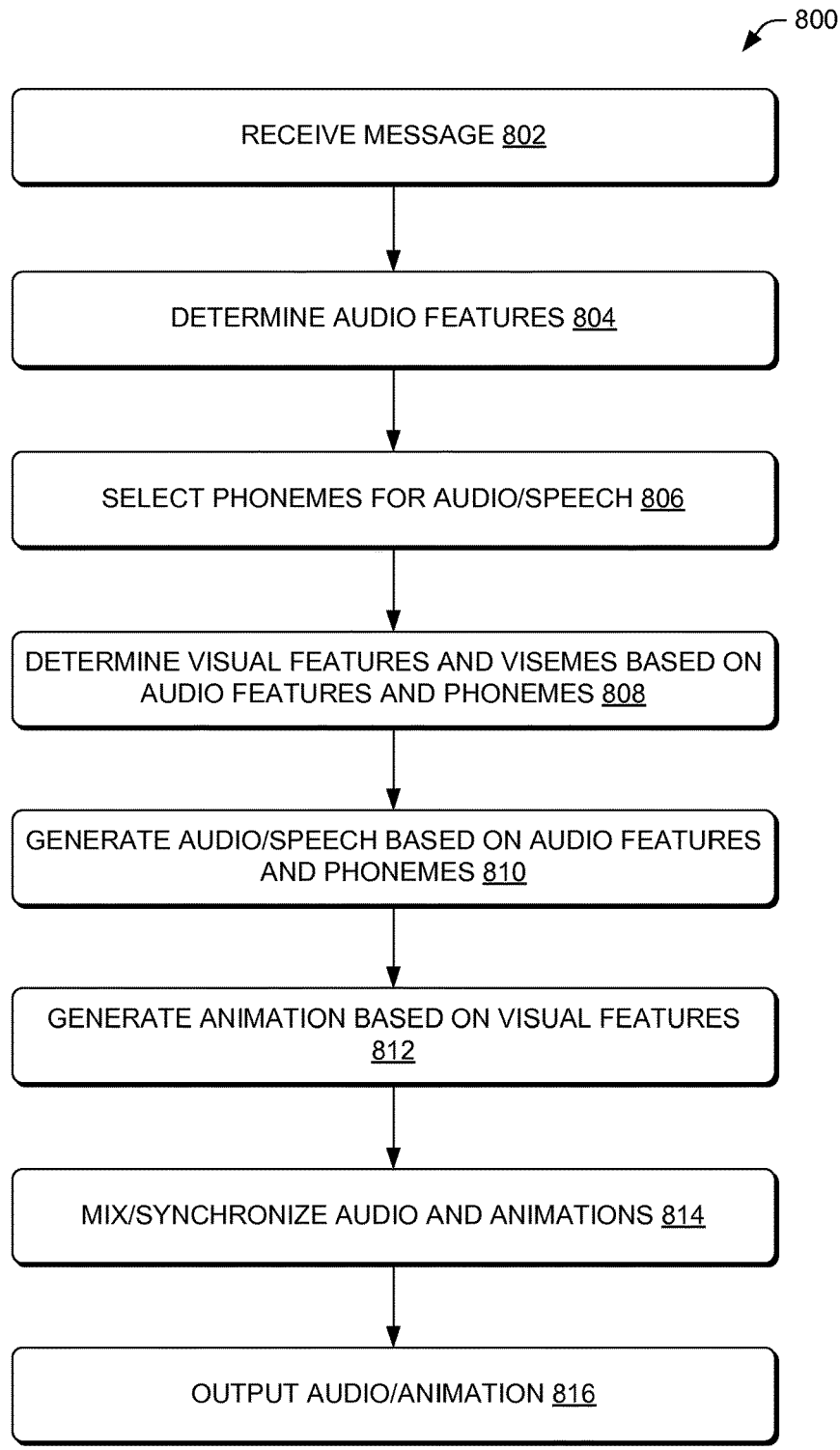
FIG. 8 is a flow diagram of an illustrative process of determining visual features to enhance avatar animation where the visual features are based on audio features.

FIG. 8 is a flow diagram of an illustrative process 800 of determining visual features to enhance avatar animation where the visual features are based on audio features. The process 800 is described with reference to at least the computing architecture 200 described above.

At 802, the message analyzer 208 may receive a message or other data to be output to a user via an avatar using at least some speech. The message may include simple text, special text, including graphics such as emoticons, and/or marked up text. In some instances, the message may be a response to a user's request, such as a response to a request to perform a command.

At 804, the message analyzer 208 may determine audio features from analysis of the message or text received at the operation 802. For example, the message analyzer 208 may inspect SSML text to determine speech indicators, which may be transformed into audio indicators for creation of ASML text. Audio features may also be created using the techniques described above and shown by example in FIG. 6. For example, information that indicates an emotion or state of mind of an originator of the message may be identified from text, punctuation, formatting, emoticons, word choice, and/or other information in the message or about the message (e.g., metadata, SSML markups, etc.), and may be associated with one or more audio features.

At 806, the audio processor 216 may determine phonemes associated with the text. For example, the audio processor 216 may implement a TTS algorithm that determines the phonemes.

At 808, the graphics processor 214 may determine visual features and visemes based on the audio features and the phonemes. For example, the graphics processor 214 may identify an audio feature of laughter determined at the operation 804, and may associate a visual feature of animated laughter with the audio feature so that the animation of the avatar visually depicts the sound of laughter included in an audio track associated with animation of the avatar. The graphics processor 214 may associate visemes with phonemes to select the visemes.

At 810, the audio processor 216 may create audio/speech based on audio features and the phonemes identified at the operation 804 and 806. The audio processor 216 may combine sounds to create the speech using TTS algorithms. The speech may be modified to include a speed, a pitch, a volume, and/or other attributes of speech, which may be included in the audio features.

At 812, the graphics processor 214 may generate animation based on the visual features and the visemes determined from the operation 808. The graphics processor may also modify the animation or portions of the animation to include or depict a rate of speech, volume, and/or other attributes, which may also be used by the audio processor 216.

At 814, the graphics mixer 218 may mix and/or synchronize the speech and animations to align the avatar's animated movements with sounds from the speech. The speech may be delayed (e.g., include a pause), to allow for insertion of an animation, such as a laughing or smiling animation.

At 814, the audio and animation may be sent to a user device and/or output by speakers and/or a display or projector.

Figure 9:
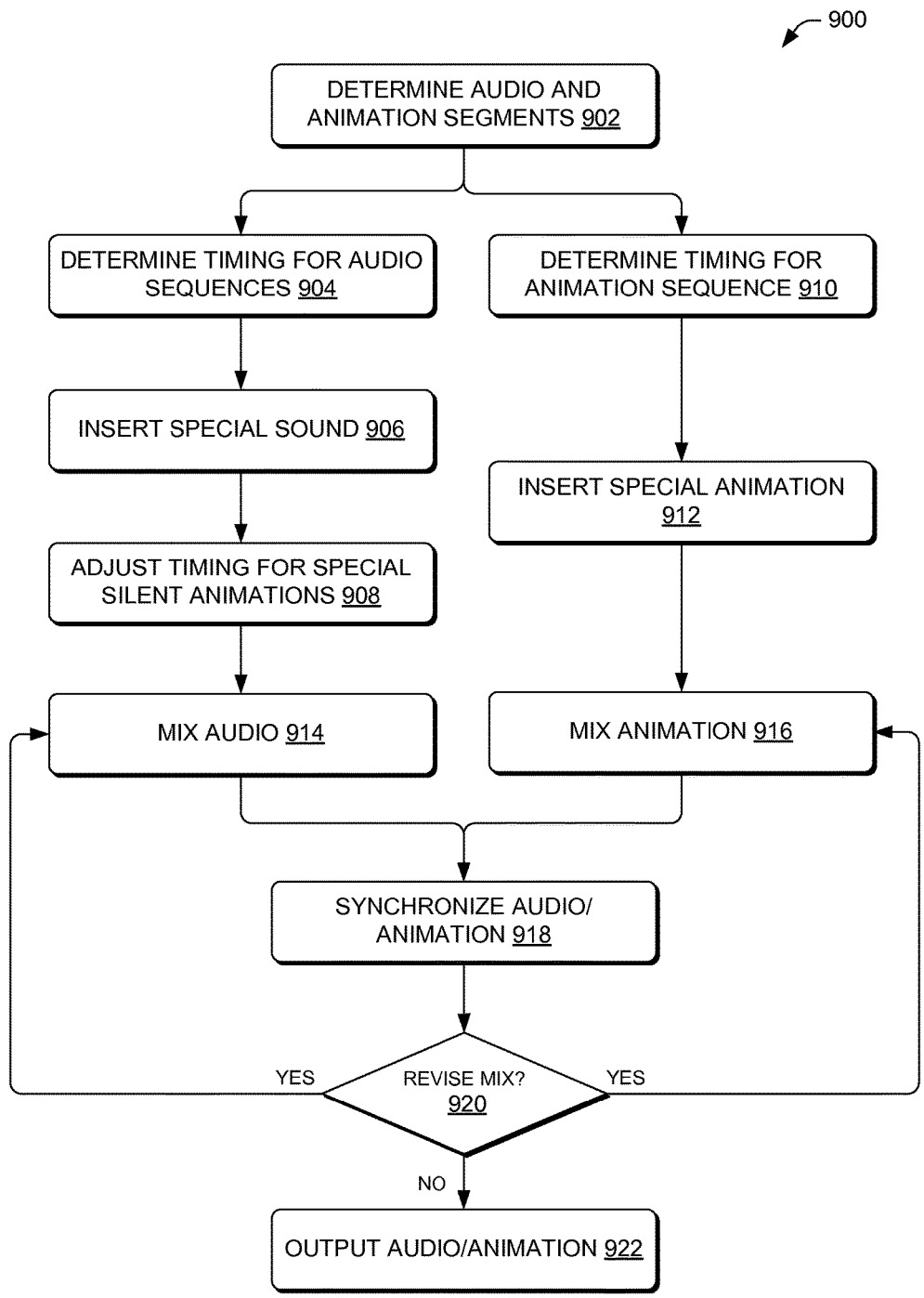
FIG. 9 is a flow diagram of an illustrative process of mixing and synchronizing the audio and visual features to create a synchronized output.

FIG. 9 is a flow diagram of an illustrative process 900 of mixing and synchronizing the audio and visual features to create a synchronized output. The process 900 is described with reference to at least the computing architecture 200 described above. The process 900 provides further details of illustrative implementations of operations 406-410 described in the process 400.

At 902, the computing device(s) 102 may determine audio and animation segments for speech and audio (e.g., phonemes and visemes) and/or animation special features (e.g., laughter, smiling action, excitement, etc.).

At 904, the audio processor 216 may determine timing for the audio sequences. The timing may be based on a determined rate of speech, among other possible factors. The timing for the audio sequences may provide a framework for timing of other events, such as special sounds and the animation, as discussed below.

At 906, the audio processor 216 may insert special sounds, such as sounds determined from ASML text and/or SSML text. The special sounds may include laughter, clapping, whistling, coughing, and/or other sounds, which may be or may not be overlaid with phonemes. For example, laughter may be a special sound that occurs separate from phonemes, but may also be overlaid with phonemes such as to mimic a person speaking and laughing at a same time. Other sounds such as clapping may be mixed with speech, but may not alter the underlying speech as described in the example of overlaid laughter.

At 908, the timing of the audio sequences may be modified to account for special silent animation that does not include audio. For example, when the special animation includes a smile or other animation without corresponding audio, then the timing of the audio may be adjusted to enable insertion of the special silent animation while maintaining synchronization of the audio and the animation.

At 910, the graphics processor 214 may determine the timing for animation sequences. The timing may be determined based at least in part on the timing of the audio sequences determined at the operation 904, along with any additional special audio sounds and/or adjustment for silent animations.

At 912, the graphics processor 214 may insert special animations, which may or may not modify the timing determined at the operation 910. As an example, the timing of the animation may be initially set to the timing of the audio sequences, but may then be extended for an additional animation of laughter that is inserted at the end of an animation sequence for the reading of a message that ends with "LOL". In this situation, the operation 906 may insert a laughter sound at the end of the audio track, which may be synchronized with the laughter animation inserted at the operation 912. Synchronization is described below.

At 914, the audio mixer 220 may mix the audio while at 916, the graphics mixer 218 may mix the animation. The mixing may create smooth transitions between segments, create fades, and/or make other adjustments to audio and/or animations to create a continuous and smooth presentation of audio and animation.

At 918, the synchronization module 222 may check synchronization of the audio and animation to ensure that the segments (e.g., a specific phoneme and corresponding viseme) are synchronized and occur at a same time during output of the audio and animation. At 920, the synchronization module 222 may revise the timing of the audio and/or animation, which may result in additional mixing. If additional mixing is needed based on modifications to the audio and/or animation, the processes 900 may return to perform the operations 914 and/or 916 again. When the synchronization is complete and correct, then the computing device(s) may output or send the audio/animation to an end user device for output.

In some embodiments, some visual features may be ignored due to incompatibility with animation sequences, based on graphics processing and/or mixing conflicts, and/or for other reasons. For example, if a message includes emoticons of a smiling face followed by a frowning face, the system may choose one of the emoticons for use to create/generate animation or may ignore both since these emoticons represent conflicting expressions that are not commonly used together and may be difficult to animate in a short amount of time. As another example, it may be impractical to animate laughing while frowning (due to conflicting emotions) or laughing and then crying (for timing issues since both laughing and crying may require multiple frames of animation to convey these actions). In some embodiments, this may be resolved during creation of the VSML text. For example, the VSML module 210 may select or only including viable animation features that can be animated in a sequence, possibly in accordance to predefined animation rules. However, the VSML text may include indicators form multiple visual actions, some of which may be ignored or otherwise not processes by the graphics mixer 218 during creating/selection of the animation features.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method of generating animations for an avatar, the method comprising:
   receiving a text message that includes text comprising an abbreviation and an emoticon;
   determining, using an audio processor that performs text-to-speech conversions, phonemes based at least in part on the text included in the text message;
   associating the emoticon with a first animation sequence performed by the avatar;
   associating the abbreviation with a second animation sequence to be performed by the avatar;
   determining, using a graphics processor, animation visemes to be performed by the avatar based at least in part on the phonemes, where a first animation viseme is associated with a first phoneme;
   generating, at least partly using an audio mixer, speech data based at least in part on the phonemes;
   generating visual synthesis markup language (VSML) text that identifies timing of the first animation sequence with respect to timing of speech generated from the speech data;
   generating, at least partly using a graphics mixer, animation data based at least in part on the animation visemes, the first animation sequence, the second animation sequence, and the VSML text, the animation data to visually represent the speech data, the emoticon, and the abbreviation;
   synchronizing at least a portion of the animation data with the speech data; and
   sending the animation data and the speech data to at least one user device.

2. The method as recited in claim 1, further comprising:
   determining that a first portion of the text includes a first text format and the second portion of the text includes a second text format that is different than the first text format;
   wherein the generating the speech data further comprises selecting an attribute associated with the second portion of text based at least in part on the second text format, wherein the generating the speech data includes determining at least one of a different pitch, volume, or speed of output of phonemes of the second portion of text based at least in part on the attribute; and
   wherein the determining the animation visemes further comprises:
   determining a first set of animation visemes associated with the first portion of the text having the first text format, and
   determining a second set of animation visemes associated with the second portion of the text having the second text format.

3. The method as recited in claim 1, further comprising selecting the animation visemes depicting an action associated with the emoticon, the action including animation of laughing.

4. The method as recited in claim 1, wherein the second animation sequence is associated with phonemes of words of the abbreviation, and
   wherein the generating the animation data, using the graphics mixer, includes mixing the first animation sequence and the second animation sequence.

5. The method as recited in claim 1, further comprising obtaining at least one of the first animation sequence or the second animation sequence from an animation library that includes predetermined animation sequences each associated with at least one of a phoneme or a silent visual action.

6. A system comprising:
   one or more processors; and
   memory to store computer-executable instructions that, when executed, cause the one or more processors to perform acts including:
   receiving data to be output to a user device, the data including text having a text abbreviation and a non-speech visual action;
   analyzing the data to determine an element of the data that is associated with the non-speech visual action represented by animation;
   performing text-to-speech conversion of text in the data to create speech data;
   determining a first animation sequence of the animation to represent the speech data;

associating a second animation sequence of the animation with the abbreviation, the second animation sequence depicting a second visual action performed by the avatar;

generating visual synthesis markup language (VSML) text that identifies timing of the first animation sequence with respect to timing of speech generated from the speech data;

synchronizing at least a portion of the first animation sequence and the second animation sequence with the speech data to at least coordinate playback of the segment of the speech data with the playback of the animation sequence; and sending the animation sequences and speech data to the user device.

7. The system as recited in claim 6, wherein a compilation of the first animation sequence and the second animation sequence creates an animation of an avatar that speaks the text-based message.

8. The system as recited in claim 6, wherein the performing text-to-speech conversion of text in the data to create speech data includes determining phonemes for words in the text, and wherein the determining animation sequences includes selecting an animation viseme for each of the phonemes.

9. The system as recited in claim 6, wherein the non-speech visual action is associated with additional audio data, and wherein the adding the segment into the speech data includes adding the additional audio data with the speech data.

10. The system as recited in claim 6, wherein the element of the data includes at least one of a graphic associated with the data or a text format of at least a portion of the text.

11. The system as recited in claim 6, wherein the element is associated with an attribute of the data, and further comprising determining at least one of pitch, volume, or speed of output of the speech data based at least in part on the attribute of the data.

12. The system as recited in claim 6, wherein the non-speech visual action represented by animation includes at least one of a laughing animation, a clapping animation, a winking animation, or a jumping animation.

13. The system as recited in claim 6, wherein the acts further include obtaining the animation sequences from an animation library that includes predetermined animation sequences, a predetermined animation sequence associated with at least one of a phoneme or a silent visual action.

14. A method, comprising:
receiving data to be output to a user device;

analyzing the data to determine an element of the data that is associated with a non-speech visual action represented by animation;

performing text-to-speech conversion of text comprising a text abbreviation in the data to create speech data;

identifying a timing of the non-speech visual action with respect to a timing of the speech data;

generating, based at least in part on the timing of the speech data and the timing of the non-speech visual action, visual synthesis markup language (VSML) text that specifies a location of the non-speech visual action with respect to other visual actions associated with animating speech generated from the text; and determining animation sequences comprising the speech data based at least in part on the VSML text.

15. The method as recited in claim 14, further comprising sending the VSML text to a graphics processor that associates the animation sequences with the non-speech visual action and other visual actions.

16. The method as recited in claim 14, further comprising determining the animation sequences to represent the speech data and the non-speech visual action.

17. The method as recited in claim 16, further comprising synchronizing the animation sequences with the speech data.

18. The method as recited in claim 16, further comprising sending the animation sequences and speech data to the user device.

19. The method as recited in claim 14, wherein the non-speech visual action represented by the animation includes at least one of a laughing animation, a clapping animation, a winking animation, or a jumping animation.

20. The method as recited in claim 14, further comprising obtaining at least one animation sequence from an animation library that includes predetermined animation sequences each associated with at least one of a phoneme or a silent visual action.

* * * * *